United States Patent [19]

McGauley et al.

[11] 3,860,696

[45] Jan. 14, 1975

[54] PRODUCTION OF IRON SULFATE MONOHYDRATE

[76] Inventors: Patrick J. McGauley, 7 Plymouth Rd., Port Washington, N.Y. 11050; Abraham A. Dor, 12700 Lake Ave., Lakewood, Ohio 44107

[22] Filed: Apr. 13, 1971

[21] Appl. No.: 133,553

[52] U.S. Cl. ............... 423/558, 423/146, 423/563
[51] Int. Cl. ............................................ C01g 49/14
[58] Field of Search ................. 23/126, 125, 202 R; 423/37, 558, 146, 147, 563

[56] References Cited
UNITED STATES PATENTS

| | | | |
|---|---|---|---|
| 1,630,881 | 5/1927 | Zalocostas | 23/126 X |
| 1,890,934 | 12/1932 | Carson | 23/126 X |
| 2,143,805 | 1/1939 | Smith | 23/126 |
| 2,424,866 | 7/1947 | Udy | 23/126 |
| 3,018,166 | 1/1962 | Powell, Jr. | 23/126 |
| 3,053,651 | 9/1962 | McGauley | 423/37 |
| 3,067,010 | 12/1962 | Long et al. | 23/202 R |
| 3,169,046 | 2/1965 | Nespital | 23/202 R |

FOREIGN PATENTS OR APPLICATIONS
840,376  7/1960  Great Britain ..................... 23/126

*Primary Examiner*—Edward Stern
*Attorney, Agent, or Firm*—Dean S. Edmonds

[57] ABSTRACT

A process for the production of high purity iron sulfate monohydrate from an iron sulfide mineral feed involving a leaching, purification, crystallization and dehydration procedure to recover a solution of iron sulfate containing iron sulfate polyhydrates and to convert iron sulfate polyhydrates in a series of steps to monohydrate crystals. The process can be also advantageously used with iron sulfide feed materials containing non-ferrous metals with full separation and recovery of the non-ferrous metals in the sulfide residue of the leaching and purification process of this invention. It can also be used for the purification of industrial pickle liquor solutions which can be treated with the iron sulfide mineral feed in this process leach circuit with full recovery of the ferrous and non-ferrous metals content of these solutions.

15 Claims, 5 Drawing Figures

PRODUCTION OF IRON SULFATE MONOHYDRATE

BACKGROUND OF THE INVENTION

This invention relates to the production of a high purity iron sulfate monohydrate and a separate concentrated sulfide residue containing valuable metals from complex sulfide ores and concentrates containing iron sulfide minerals and non-ferrous metals of significant value.

It is particularly suited to the treatment of iron sulfide ores containing base metal sulfides which because of their complex mineralogy or relatively fine grain size distribution do not lend themselves to economic processing by conventional methods of separation and beneficiation for the selective recovery of the valuable metals they contain.

It has, furthermore, the important advantage of recovering a substantial part of the iron sulfides sulfur in the form of hydrogen sulfide. Thus it lends itself to the adoption of pollution free flow-sheets for the complete separation and recovery of all of the valuable constituents of the sulfide ores or concentrates, including both iron and base metals while all of the sulfur can be recovered as elemental sulfur, which is the form under which it can be marketed most easily.

Prior art processes for the production of iron sulfate, generally have used available supplies of industrial wastes such as the acidic effluent from coal, steel, and pigment production, as feed materials, and generally have operated primarily as waste disposal processes. Most of these processes are not capable of extracting iron from iron bearing sulfide minerals.

Essentially, in all of them, non-ferrous impurities remain with the iron products recovered, thus adversely affecting their quality and reducing their value for use in the production of steel. Furthermore, these processes tend to consume excessive quantities of fuel to dehydrate the iron sulfate. This results in prohibitive costs for the products obtained, which cannot be marketed profitably. Under present conditions, the use of these processes would result in commercial losses and would only be justified on the basis of waste disposal considerations.

The prior art process of U. S. Pat. No. 3,053,651 is capable of extracting and recovering iron both from iron bearing sulfide minerals, and from waste liquors containing iron sulfate and sulfuric acid. This process also provides for purification of the solution, and the iron sulfate product. However, partially soluble sulfides of metals like zinc and/or nickel frequently are present in available feed materials, and this patent does not disclose any process for the removal of such metals from the iron sulfate solution. When present, these base metal impurities would accumulate in iron sulfate crystals, if not removed, and would generally render the iron sulfate products unacceptable as a source of iron oxide for use in the production of steel.

The above process, in common with other prior processes for the production of iron sulfate, discloses the use of commercial fuel as the source of heat to separate the water from the iron sulfate. This would require excessive quantities of fuel because of the large amounts of water to be removed, resulting in excessive operating costs.

SUMMARY OF THE INVENTION

The process of this invention provides a novel combined leaching and crystallization procedure that has many advantages including:

a. The ability to use a minimum amount of water throughout the leaching and crystallization processes, b. the abilitiy to use waste heat from the process to evaporate water from the leach solution, c. the elimination or the substantial reduction of the consumption of fuel in the process to separate water from the iron sulfate, d. significant savings in the cost of fuel, and significant improvements in the operation economy and commercial feasibility of recovering separately iron sulfate monohydrate and a residue containing recoverable valuable non-ferrous metals, and e. the production of substantial quantities of hydrogen sulfide which can be used subsequently for the selective separation of the base metals present in the feed material and the surplus of which can lend itself to the economic recovery of elemental sulfur.

The invention further includes an improved selective leaching process for the production of high purity iron sulfate monohydrate from feed materials that contain partially soluble sulfides of metals like zinc and/or nickel, and an improved process for concentrating the valuable non-ferrous metal components of the feed, and for recovery of these components in a sulfide residue of high commercial value.

This invention includes novel crystallization and dehydration procedures for the separation of iron from the solution in form of iron sulfate monohydrate, and also includes a novel combination of such leaching and crystallization procedures to enable the use of the process waste heat from the leaching system for crystallization and dehydration of the iron sulfate product and recycle of the mother liquor from the crystallizer to the leaching system for cooling purposes and for dissolving iron sulfate crystals.

The auxiliary procedures of this invention provide a combined process for recovery of the valuable components of complex sulfide ores that contain iron sulfide minerals, as major components, and valuable non-ferrous metal, such as zinc, nickel, lead, tin, copper, gold, silver, etc. and mixture thereof, of significiant value, as other components of the ores. The most important of these procedures involves process steps such as the following:

a. Treatment of the raw ores by the novel combined selective leach and crystallization procedures of this invention, to extract selectively the iron from the other components of the rock, to separate and concentrate the residual minerals, and to recover the iron as high purity crystals of iron sulfate monohydrate.

b. Treatment of the concentrated residue from the above leach, rather than the raw ore, by conventional mechanical procedures such as froth flotation, etc., to separate the gangue materials for discard, and the valuable minerals for individual recovery, with significant improvements in recovery of the valuable metals, and significant savings in the overall cost of equipment needed.

DETAILED DESCRIPTION

The novel selective leach procedures of this invention, in combination with the "activation" roast procedures of U. S. Pat. No. 3,053,651, are capable of extracting 70 to 100 percent of the iron content of sulfide mineral mixtures containing iron. Moreover, the selective leach procedures of this invention are capable of producing an iron sulfate leach solution that is essentially free of sulfates of metals like zinc and/or nickel, from iron bearing feed materials that contain compounds of these partially soluble metals.

The selective leach procedures of this invention also are capable of extracting 70 to 100 percent of the iron with essentially no simultaneous extraction of the zinc and/or nickel, from certain unroasted or un-"activated" mixtures of sulfide minerals that contain sulfuric acid, reactive iron sulfides such as pyrrhotite or troilite as major components. The degree or extent of iron extraction from any specific sample of the sulfide mineral feed, by the selective leach procedures of this invention, however, was found to depend on both natural properties of the minerals in the feed, and/or on the particular methods adopted for the pretreatment procedures of the activation roast process as described in U. S. Pat. No. 3,053,651. In all cases, a sufficient amount of acid reactive iron sulfide should be present to render the process economically attractive. Metallic iron can be present in the feed material with no deleterious effects.

A variety of iron sulfide mineral mixtures can thus be processed by the process of the invention to recover iron sulfate monohydrate, sulfur and non-ferrous metal values so long as a sufficient proportion of the iron sulfide content is acid soluble, either naturally or through suitable activation, to eventually place an economic amount of the iron sulfide into solution. The iron sulfide mineral mixtures which can be treated include raw sulfide ores as well as partially processed sulfide ores such as calcines and concentrates naturally or inherently containing economic quantities of acid reactive iron sulfide or ores, calcines or concentrates which have been "activated" to render an economic quantity of the iron sulfide content acid reactive in accordance with the process of U. S. Pat. No. 3,053,651, or by any other process. The sulfide mineral mixtures processed according to this invention can thus be those available in existing mineral deposits, and will include raw ores that contain pyrrhotite as a major component of rock, and such minerals as sphalerite, chalcopyrite, galena, pentlandite, etc., as other components. Additional available feed materials will include lead, zinc, copper and/or nickel concentrates that are high in content of iron sulfide minerals and/or high in content of valuable impurities that are unrecoverable by conventional processes. Those sulfide mineral feeds containing pyrrhotite as a major component sometimes contain acid reactive iron sulfide and can be used directly as a feed according to this invention without the "activation" roast referred to above.

The selective multi-stage leaching process of this invention broadly involves contacting an iron sulfide mineral feed, containing acid soluble iron, which also generally contains non-ferrous metals in closed vessel leaching equipment with sulfuric acid at sufficient concentrations and temperatures to initiate and produce an intense and high rate of reaction between the acid and the acid soluble iron in the mineral solids to produce iron sulfate, process heat and $H_2S$ gas.

In order to initiate and to produce this high rate of reaction between the acid and the iron in the mineral solids, it is preferred to use the sulfuric acid in high concentrations preferably above 40 percent and a temperature above 80° C. preferably above 95°C.

Simultaneously with the contacting of the iron sulfide mineral feed with the concentrated sulfuric acid, the slurry is diluted with water and/or aqueous solutions containing iron sulfate and/or sulfuric acid in sufficient quantity to produce and maintain a high density slurry. The viscosity of this slurry is advantageously such that it is just capable of being circulated in the equipment and undue dilution of the slurry is to be avoided.

The reaction is then permitted to continue to produce a high density slurry in this first stage leach that contains residual solids and a mineral feed in a solution that is essentially saturated with iron sulfate and preferably containing crystals of iron sulfate and a gas that contains $H_2S$ and water vapor.

The slurry is then mixed with solutions that are capable of dissolving all crystals of iron sulfate to dissolve the iron sulfate crystals and to cause the reaction of the remaining acid and impurities in the solution with acid soluble iron from the mineral feed and $H_2S$ gas respectively to complete the leaching in this second stage leach.

The product produced in this second stage leach is a low density product slurry containing a residue in which the content of the acid soluble iron from the mineral feed exceeds the acid content of the solution on a stoichiometric basis, a purified solution that is essentially saturated with iron sulfate at temperatures between 50° and 80°C., and preferably at or near 65°C., and a gas that contains $H_2S$ and water vapor.

In the case of the co-current leaching process described below, the sulfuric acid will be equal or approximately equal to the acid soluble iron content of the mineral feed on a stoichiometric basis and, although it generally will not be necessary to add acid soluble iron from the mineral feed or other acid soluble iron such as metallic iron to perform the second stage leaching operation, it may at times be advantageous to do so in order to promote the precipitation of undesirable impurities that may have dissolved.

In the case of the counter-current leach process described below, the content of acid soluble iron in the mineral feed to the first stage of the neutral leach circuit, generally will be in excess of the content of sulfuric acid in the leach slurry on a stoichiometric basis, and additional mineral feed containing acid soluble iron alone or together with other types of acid soluble iron such as metallic iron, generally will not be charged to the low density slurry in the last stage of the neutral leach.

The residue from the above neutral leach circuit is charged to an acid leach circuit and contacted with sulfuric acid solution in which the content of acid exceeds the content of acid soluble iron in the residue on a stoichiometric basis, and the resulting slurry reacted until the acid soluble iron is extracted from the solids. The solids then are separated and recovered as a product of the leaching process, and the acidic solution is recycled to the high densisty stage of the neutral leach circuit.

Figure 1:
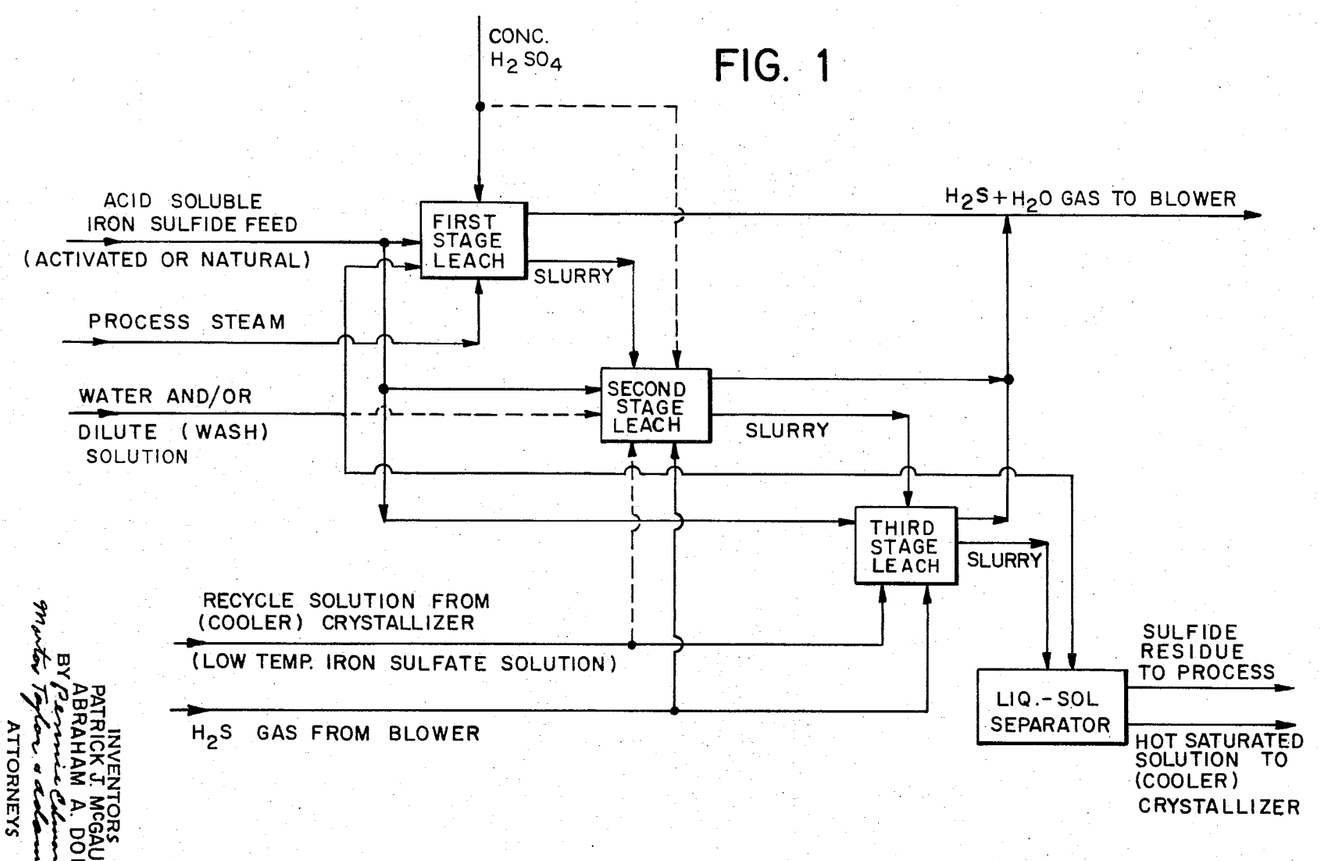
FIG. 1 is a flow diagram of a selective iron cocurrent leaching process in accordance with the invention.

The co-current leach process of this invention is shown in FIG. 1. It incorporates two or more stages in each of which optimum conditions are maintained by the control of several important factors. The purpose of these controls is to ensure maximum dissolution of the iron in the feed, secure minimum dissolution of non-ferrous metals, such as zinc and nickel, and obtain an essentially saturated ferrous sulfate solution near its temperature of maximum solubility.

The first stage is a high density, high acid concentration, high temperature leach stage in which an intense and fast reaction is ensured between sulfuric acid and the acid soluble iron sulfides in the feed.

The second stage is a lower density, lower acid concentration leach stage in which the iron dissolution is continued while conditions are established to inhibit the simultaneous dissolution of non-ferrous metals like zinc and/or nickel.

The third stage is a dilution and final purification stage in which metals such as zinc and/or nickel that may have gone in solution are precipitated and in which the temperature and ferrous sulfate concentration are brought to their optimum value for the purpose of recovering monohydrate ferrous sulfate crystals in subsequent operations.

In some cases, it may be advantageous to combine the second and third stages into a single stage.

The major characteristics of these three stages are:

a. The total sulfuric acid requirements of the leach process are distributed between the three stages in suitable proportions. In some cases, they can be added entirely in the first stage. Preferably, 70–100% of the total acid requirements are added at high concentration to the first stage in order to ensure as intense and high rate of reaction as possible in this stage. Preferably, less than 30% of the total sulfuric acid requirements are added to the second stage, where they may also be partially or totally obtained, when available, from the free acid content of by-product or pickle liquors. Preferably, no fresh sulfuric acid should be added to the third stage, where it is essential for good process control to maintain the final pH, preferably between about 1.5 and 2 at approximately atmospheric pressure.

b. The iron sulfide feed is distributed between the three stages in suitable proportions or it can be added, in some cases, entirely in the first stage. Most of the feed, preferably 70–100%, is added to the first stage with as little dilution water as possible so as to maintain as thick a pulp density as possible in this stage, thus securing as intense and high rate of reaction as possible. A small fraction of the feed, preferably less than 20%, may be advantageously added to the second stage to raise the pH at the end of this stage, preferably between about 1.5 and 2 at approximately atmospheric pressure, in order to inhibit the dissolution of sulfides of metals like zinc and/or nickel. Similarly and for the same purpose, the remainder of the small fraction of the feed, preferably less than 10%, can be added to the third stage to maintain its pH, preferably between about 1.5 and 2. In some cases, the free acid level at the end of the third stage may be too low to react with the soluble iron sulfide in the feed, and in order to maintain proper pH control, acid soluble iron oxides or metallic iron may be advantageously added to neutralize excess acid in the third stage to secure the satisfactory purification of the final ferrous sulfate solution.

c. Steam is injected into the leach vessels when required to circulate the pulp in the vessels and to increase the rate of iron extraction by dilution of the $H_2S$ gas and control of its partial pressure in the leach vessels.

d. $H_2S$ gas, which is produced in the leach reactions, is recycled through the second and third stage vessels in order to increase its partial pressure in these vessels and thus promote the precipitation of sulfides of non-ferrous metals, such as zinc and nickel by reactions such as the following:

The residual levels of zinc and nickel sulfates remaining in solution are reduced to acceptable values by simultaneous control of the pH and the partial pressure of $H_2S$, as described in the preceding paragraphs.

e. The pulping water requirements of the first stage and the dilution water requirements of the second stage are obtained principally from dilute recycle solutions and can be complemented by either fresh makeup water and/or available by-product or water ferrous sulfate solutions which can then be incorporated in the system and processed so as to fully utilize their free acid content and completely recover both their ferrous and non-ferrous metal content. Their iron content will be recovered in the iron sulfate product and their non-ferrous metal content in the insoluble sulfide residue product.

f. The third stage is a dilution and purification operation in which the slurry discharged from the second stage which contains dissolved sulfates as well as undissolved in sulfate crystals, base metal sulfides and gangue in suspension, is mixed with a stream of cooled return liquor (15°–35°C.) from the crystallizer. In the resulting mixture, the ferrous sulfate crystals are fully dissolved while the sulfides and gangue remain in suspension, and any dissolved non-ferrous metals such as zinc and nickel are precipitated by the processes described in the preceding paragraphs (pH control and recycle of $H_2S$). To optimize the subsequent operations for the recovery of dehydrated ferrous sulfate crystals, the pregnant ferrous sulfate solution obtained in the third stage should be almost at saturation and preferably at a temperature slightly higher than the maximum solubility temperature of about 63°C. for ferrous sulfate.

The first step of the co-current leach system shown in FIG. 1 is a high temperature, high acid concentration and high solids density first stage into which a major portion, preferably 70–100%, of the iron sulfide feed is fed at as high a pulp density as is compatible with satisfactory pumping and flow conditions. In this stage, most of the acid stoichiometrically needed for the leach reactions (preferably 70–100% of this quantity) is added as concentrated sulfuric acid in order to allow a high pulp density to be maintained. Dilution water required to bring the pulp density to its desired level is advantageously supplied, when available, in the form of by-product or waste iron sulfate acidic solutions which can thus be satisfactorily processed for pollution abatement, with full recovery of their content of acid and of ferrous and non-ferrous metals.

It is advantageous to maintain the slurry in the leach vessels of the first stage at a temperature close to or slightly above its boiling temperature at atmospheric pressure.

High temperature, high pulp density and high acid concentrations promote intense and fast leaching of the soluble iron sulfides in the feed, according to the following principal reaction:

$$FeS + H_2SO = FeSO_4 + H_2S$$

Steam generated by the heat of reaction helps remove the hydrogen sulfide gas evolved during these reactions, thus accelerating the reaction rate of the acid with iron in the mineral feed. The steam and $H_2S$ gas generated are collected and removed for subsequent use in the process. The water evaporated must be replaced by the injection of available solutions or of makeup water and steam to prevent solidification of the hot pulp which contains both suspended crystals of iron sulfate and undissolved solids from the mineral feed. This pulp is discharged into the second stage leach vessels.

While the principal aim in the first stage leach is to ensure high iron extraction, the purpose of the second stage of leaching is to initiate the purification of the iron sulfate by promoting dissolution of the crystals and establishing conditions favorable to the precipitation of metals such as zinc and nickel that may be present in the solution. In this stage, the balance of the feed and of the acid requirements are preferably added. Additional quantities of available by product waste acidic iron sulfate solutions can also be introduced in this stage to bring the pulp density and temperature to the desired levels.

As the leach reactions progress in the second stage leach, the pH gradually rises and conditions favorable to the precipitation of sulfates of metals like zinc and/or nickel are further promoted by the recirculation in the vessels of this stage of blown $H_2S$ gas with the aim of increasing its partial pressure in the second stage leach vessels. This starts the precipitation of zinc and/or nickel sulfates according to the following reactions:

$$ZnSO_4 + H_2S = ZnS + H_2SO_4$$

$$NiSO_4 + H_2S = NiS + H_2SO_4$$

It is advantageous to operate the second leach stage at temperatures between about 75°C. to 85°C. To secure as complete a precipitation as possible by $H_2S$ of the non-ferrous metals, it is important to control the pH and maintain it preferably between about 1.5 and 2 at approximately atmospheric pressure. This requirement determines the respective quantities of mineral feed and of sulfuric acid that can be introduced in the second stage leach vessels. In some cases, it has been found advantageous to supplement the acid soluble iron sulfides feed with suitable quantities of soluble iron oxides or metallic iron that will more readily combine with residual free acid in the leach slurry and ensure raising the pH of the solution to the required levels.

The pH range of between about 1.5 and 2 to secure optimum precipitation by $H_2S$ gas of zinc and/or nickel referred to herein is the preferred pH range when operating the leach vessels at approximately atmospheric pressure. This pH range used will generally be between about 1.7 and 2. Although it is advantageous to operate at atmospheric pressure optimum precipitation of the zinc and/or nickel can also be obtained at lower pH levels such as 1 or below if the partial pressure of $H_2S$ gas in the vessel and/or solids content of the slurry are increased to a suitable level.

As appears from this discussion, optimum conditions for the precipitation of partially soluble sulfides of the non-ferrous impurity metals by means of $H_2S$ are secured by a satisfactory combination of high partial pressures of $H_2S$ and suitable pH, associated with a suitable slurry temperature. They can be determined easily in practical operation by those schooled in the art and adapted to the particular properties which may characterize different iron sulfide ores or concentrates.

The product transferred from the second to the third stage is a relatively high solids pulp maintained at a temperature higher than the temperature of maximum solubility of ferrous sulfate which is equal to 63°C., approximately, and which contains in suspension both undissolved sulfate crystals and insoluble base metal sulfides and gangue. In the third stage, this slurry is mixed with cooled return mother liquor from the crystallizer to form a solution, the temperature of which is maintained preferably at or near 63°C. corresponding to the maximum solubility of iron sulfate. At this temperature, the iron sulfate crystals produced in the first or second stage are completely dissolved and consequently the slurry consists essentially of a nearly saturated ferrous sulfate solution holding in suspension the base metal sulfides and the insoluble gangue.

This solution may still contain undesirable residual levels of partially soluble non-ferrous metals such as zinc and nickel. To complete their precipitation, additional $H_2S$ is blown through the solution, and if necessary residual free sulfuric acid may be partially neutralized to raise the solution pH, preferably between about 1.5 and 2, by adding suitable small quantities of acid soluble iron sulfide feed or if necessary acid soluble iron oxides or metallic iron.

Thus, the third stage operations are set to achieve two very important purposes:

a. secure a ferrous sulfate solution free from undesirable base metal impurities,
b. ensure the integration of the leach and crystallization systems in an optimum combination, thus securing most satisfactory conditions in both these systems, with full reuse of available return crystallizer solutions and full utilization of all waste heat available from the leach system.

In some cases, it may be advantageous to combine the second and third stages in a single dilution and purification operation.

Figure 4:
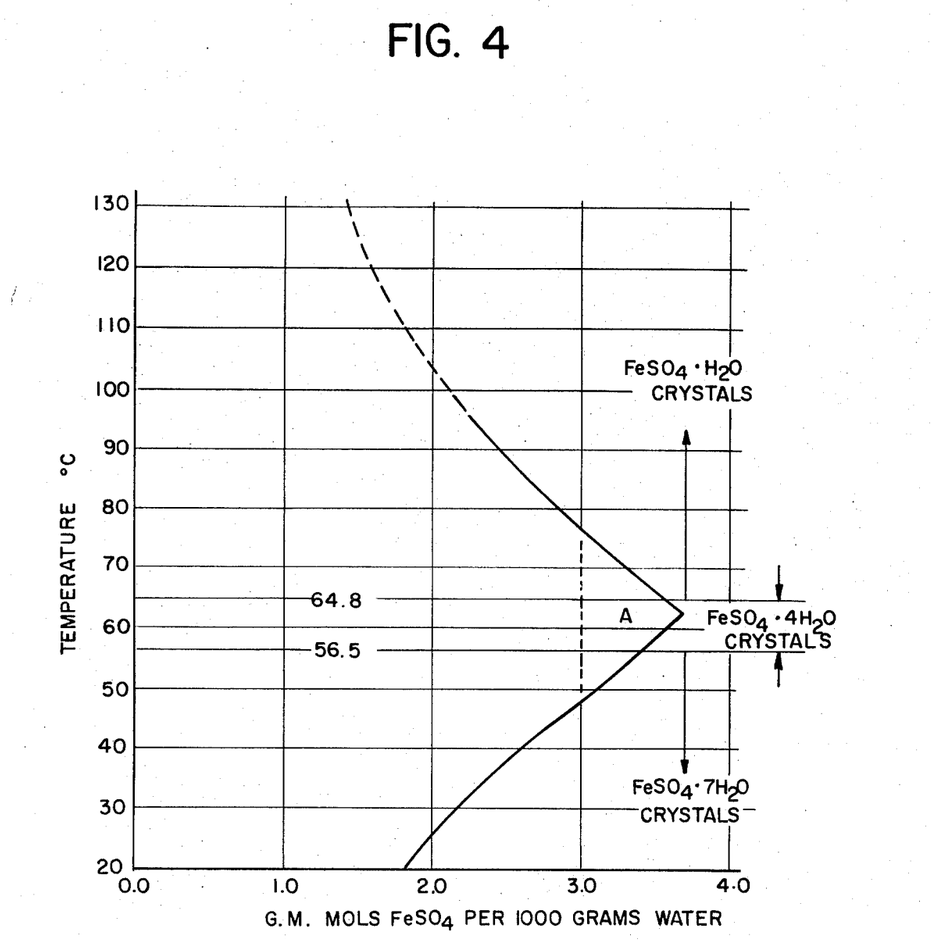
FIG. 4 is a graph showing the temperature and concentrations at which various forms of iron sulfate hydrates exist in equilibrium with their saturated solutions.

The recycle solutions of saturated iron sulfate from the first or third stage crystallizer are available and the temperature and amount of these recycle solutions can be adjusted so as to be sufficient to dissolve substantially all of the iron sulfate crystals contained in the second stage slurry. It is advantageous to have the iron sulfate solution in this third stage at slightly above 63°C. at which temperature the iron sulfate is at its maximum solubility. The temperature of the iron sulfate solution in the third stage can vary, however, even though this will effect the economics of the process. The temperature of the iron sulfate solution can, for example, vary between about 50° to 70°C. as shown by the triangular area of graph in FIG. 4, designated A. Once the temperature falls outside 50° to 75°C., the process can still be operated but the economics of the process are then significantly impaired.

The solid residue contains:
a. the insoluble gangue elements of the mineral feed,
b. the partially soluble sulfide compounds of non-ferrous metals, such as zinc and nickel from the feed minerals,
c. a small amount elemental sulfur which may be produced during the leach reactions, and
d. undissolved iron sulfides.

This residue is available for further processing for the separation and recovery of its valuable components. In cases where the gangue contents of the residue are relatively high, it can be beneficiated in a normal flotation circuit where the sulfides and sulfur are separated advantageously from the gangue minerals which are rejected as tailings. In some cases, these tailings may contain valuable metals like tin and can be processed for the latter's recovery. The sulfide concentrates can also be processed for the separation and recovery of their valuable constituents, which may include copper, lead, zinc, nickel, cobalt, silver, gold, etc.

The saturated solution of iron sulfate recovered from the liquid-solid separator is a purified leach liquor almost saturated with iron sulfate at a temperature advantageously slightly above 63°C. and advantageously suitable as a feed liquor to the crystallizer system.

Figure 2:
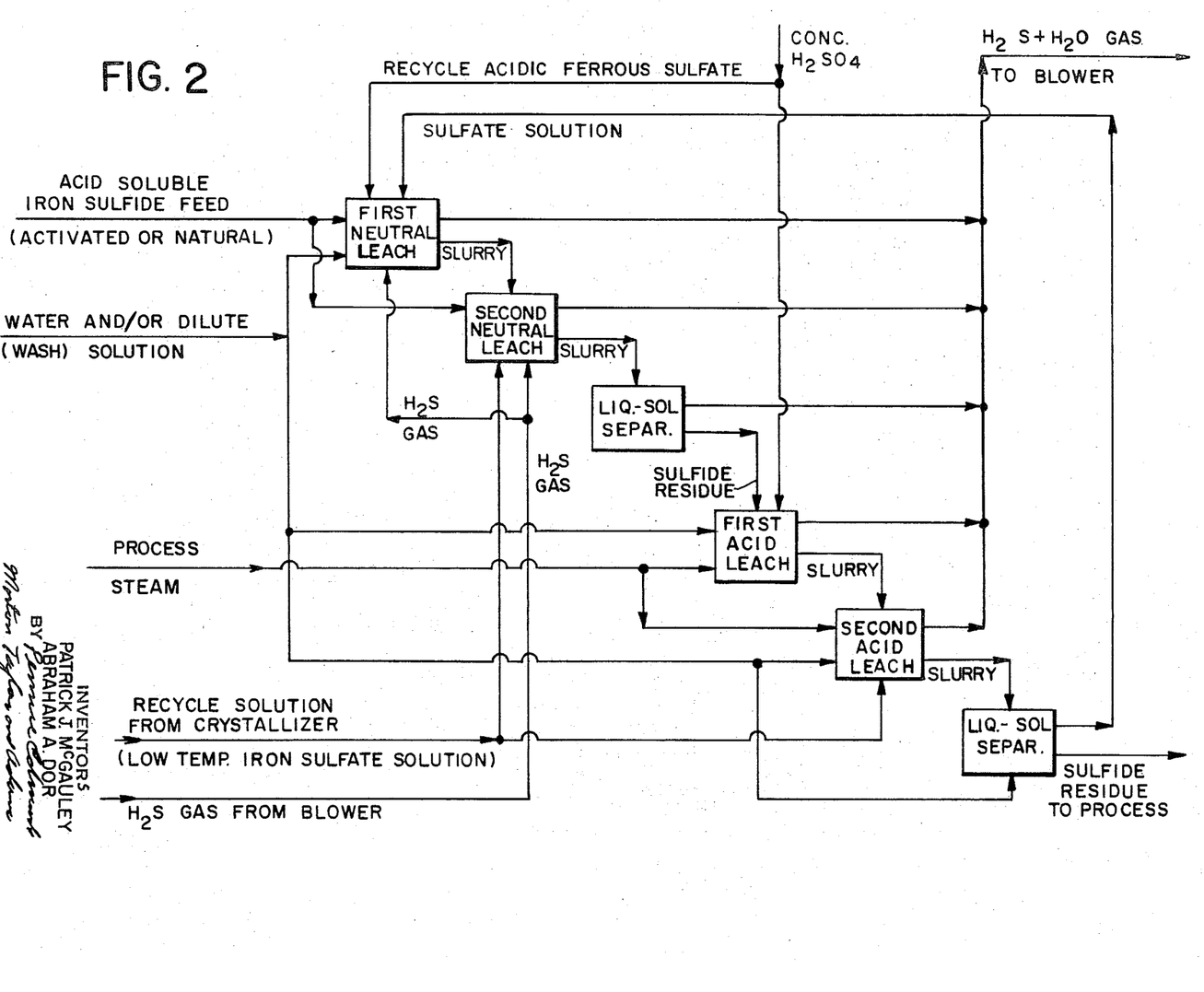
FIG. 2 is a flow diagram of a selective iron countercurrent leaching process in accordance with this invention.

FIG. 2 is a flow diagram illustrating the counter-current leach circuit of this invention. This circuit includes, in principle, a two-stage neutral leach combined with a two-stage acid leach. In both the neutral and acid leach circuits, the first stages are higher acid concentration, higher solids density and higher temperature stages with the aim of securing intense and fast leach reactions. The purpose of the second stage is to bring conditions to correspond to maximum solubility of ferrous sulfate solution and are consequently conducted at lower temperatures and higher dilutions than the first stages.

Under some conditions, depending on the natural or induced reactivity of the pyrrhotites in the mineral feed, it may be possible and advantageous to combine the two neutral leach and the two acid leach stages into single stages, respectively.

While in the co-current circuit described in the preceding text, both the final purified ferrous sulfate solution and the concentrated non-ferrous metal sulfide residue are obtained in the third leach stage, in the counter-current leach circuit described in the following text, they are obtained in two different stages. The purified ferrous sulfate solution is obtained in the second neutral leach stage while the sulfide residue is obtained in the second acid leach stage. The residue of the second neutral leach stage is processed further in the acid leach circuit, while the ferrous sulfate solution obtained in the second acid leach stage is recirculated to the neutral leach circuit.

The principal characteristics of the counter-current leach circuit are:

a. The sulfuric acid additions are distributed between the first stages of the neutral and acid leach circuits in suitable proportions. While the total quantity of acid added must correspond stoichiometrically to the total requirements of the acid soluble part of the pyrrhotite and gangue in the mineral feed, the total acid available in the first stage of the neutral leach (equal to the sum of the fresh acid added and the recycled acid from the acid leach circuit) will be always smaller than these requirements, thus resulting in a low free residual acid level and a relatively high pH, preferably higher than 1.5 – 2.0 at the end of the neutral leach. On the other hand, the acid added to the first stage of the acid leach will be in excess of the requirements of the soluble pyrrhotite remaining in the neutral leach residue, thus ensuring its solubilization. This results in a high level of free acid in the acid leach solution which is recycled to the first stage of the neutral leach. In general, it would be advantageous to increase the fraction of the total acid which is added to the first stage of the neutral leach circuit in order to promote and accelerate the dissolution of pyrrhotite in the feed to this stage. On the other hand, it would be advantageous to increase the fraction of the total acid added to the first stage of the acid leach circuit, in order to ensure that as much as possible of the residual pyrrhotite in the neutral leach residue is dissolved. It must be noted, however, that too much acid added to the first acid leach stage may cause difficulties in the final settling and filtration of the acid leach insoluble residue. The optimum distribution of the acid additions to the first stages of the neutral and acid leach will vary for different ores, concentrates or activated calcines and can be determined by those versed in the art on the basis of simple laboratory or pilot scale tests.

b. The mineral feed is preponderantly added to the first neutral leach stage, preferably 90–100%. As the pH in the second neutral leach stage should be kept preferably between about 1.5 and 2 atmospheric pressure to obtain a ferrous sulfate solution of suitable purity, it may be advantageous, in some cases, to add a small fraction of mineral feed to this second neutral leach stage for final acid neutralizing. In some instances, it may be necessary for that purpose to use, instead, acid soluble iron oxides or metallic iron, as described previously for the co-current leach circuit.

c. The partial pressure of $H_2S$ in the first stage of the acid leach circuit is controlled and the gas phase removal is promoted by water vapor formed during the leach reactions or injected directly in the form of steam to maintain proper agitation.

d. $H_2S$ gas produced in the leach reactions is recycled through the vessels of the neutral leach circuit to increase its partial pressure in these vessels and promote the precipitation of metals like zinc and/or nickel which may be present in the solution, by reactions such as:

$$ZnSO_4 + H_2S = ZnS + H_2SO_4$$

$$NiSO_4 + H_2S = NiS + H_2SO_4$$

The residual levels of zinc and nickel remaining in solution are reduced to acceptable values by simultaneous pH control, preferably between about 1.5 and 2 at atmospheric pressure. In some cases, it may be advantageous to add small quantities of acid soluble iron oxide or metallic iron to neutralize residual acid in the final stage of the neutral leach.

e. The second neutral leach stage is the dilution and purification operation in which the slurry discharged from the neutral leach first stage is mixed with a stream of cooled (15°–35°C.) return liquor from the crystallizer. In the resulting mixture, ferrous sulfate crystals are fully dissolved while unleached sulfides and gangue remain in suspension. Any partially soluble non-ferrous metals such as zinc and nickel are precipitated by the processes described in the preceding paragraphs (pH control and recycle of $H_2S$). To optimize the subsequent operations for the recovery of monohydrate ferrous sulfate crystals, the pregnant solution obtained in the neutral leach second stage should be almost at saturation and preferably at a temperature slightly higher than about 63°C., the maximum solubility of ferrous sulfate in the leach solution.

As shown on FIG. 2, in the counter-current leach system of this invention, all or most of the mineral feed is charged to the first stage of the neutral leach circuit where it is contacted with sulfuric acid in quantities deficient with respect to the soluble iron content of the solids on a stoichiometric basis so that a so-called "neutral" leach is carried out. The solids are pulped with an available solution or water to form a slurry of high pulp density and of viscosity that permits circulation of the pulp in the leach vessels in the same manner as described with respect to the co-current leach system of FIG. 1.

The above pulp is contacted with $H_2S$ gas, the partial pressure of which is controlled to precipitate advantageously all zinc and/or nickel from the solution. The pulp, now containing both undissolved solids from the mineral feed, and crystals of iron sulfate in a purified solution that is essentially saturated with iron sulfate, is discharged to the second stage of the neutral leach system.

Recycle solutions of iron sulfate from the first and/or third crystallizer of the crystallizer system in sufficient quantities and at suitable temperatures are added to the pulp from the first neutral stage to dissolve substantially all of the crystals of iron sulfate from the solids and to produce in the second neutral stage vessels a low density slurry containing undissolved solids from the mineral feed in a purified solution that is essentially saturated with iron sulfate at a temperature between 50°–75°C. and advantageously slightly higher than 63°C. $H_2S$ gas is injected to the second stage of the neutral leach to precipitate any zinc and/or nickel that may be present in the solution, in a step similar to that described in the preceding pages with respect to the third stage of the co-current leach process.

The pulp from the second stage of the neutral leach is treated by suitable means such as a conventional liquid-solid separation and the clarified solution is recovered as a major product of the novel selective leach process of this invention. The solids are recovered in the form of a high density pumpable slurry or filter cake and sent to the first stage of the acid leach of this counter-current process.

In the first acid leach stage, the above solids, recovered from the second neutral leach stage, are contacted with concentrated sulfuric acid in quantities that are substantially in excess of the stoichiometric requirements of the soluble iron still contained therein. The high density slurry is mixed with water and/or available dilute solutions as defined herein to produce a pulp of high density and of suitable viscosity to permit circulation of the slurry in the leach vessels. The pulp is also advantageously contacted with steam, and the supply of steam is modulated to dilute the $H_2S$ gas generated by the leach reactions, to promote maximum extraction of iron from the solids by removal of the $H_2S$ product with gases from the leach vessels and to provide agitation of the slurry to improve efficiency.

The relatively high density pulp of the first acid leach stage is fed into the second stage vessels of the acid leach where it is diluted with water or available dilute recycle solutions both to dissolve crystals of iron sulfate and to facilitate separation of the solids from the liquid. Dilution can be effected with available wash solutions or available waste liquor. The solids, now reduced in content of iron sulfur and concentrated in content of non-ferrous and/or precious metals, are recovered as a valuable product of the process. The valuable components of this product may be concentrated further by flotation, as described in the preceding pages in conjunction with the cocurrent leach system.

The acidic solution from the above separation, relatively high in content of acid and iron sulfate, is recycled to the first stage of the neutral leach circuit as indicated on the flow diagram of FIG. 2.

All of the conditions, adjustments and purposes of the various steps in the leach circuit, such as the introduction of steam, addition of available solutions, $H_2S$ gas recycle, recirculation of iron sulfate solutions, etc. are the same as already described for the co-current leach system. The iron sulfate solution recovered from the second neutral leach stage has essentially the same properties and characteristics (such as saturation, temperature, purity, etc.) as the solution recovered from the third stage leach of the co-current leach system.

The major similarities and differences between the co-current and the counter-current leach procedures of the invention may be outlined as follows:

a. Both the co-current and counter-current procedures provide for an intensive first stage leach of the solid feed, at high temperature, and high acid concentration to initiate the reaction and to generate a high density pulp containing crystals of iron sulfate.

b. Both provide for neutralization of the acid (to pH = 1.5 to 2.0) with an excess quantity of acid soluble iron, and for dissolution of the crystals in one or more stages of a low temperature neutral leach (at 60° to 80°C.), that is characterized by the essential presence of both acid soluble iron in the solids, and $H_2S$ gas in contact with the slurry until the solids are separated from the solution.

c. Both procedures also provide for separation of the liquid and solids from (b) above, and for accumulation of the purified solution as a major product of either procedure.

d. The co-current leach process provides for accumulation of the residue from (c) above, as a concentrate of the valuable non-ferrous and precious metals from the mineral feed, and a major product of the process.

e. The counter-current process provides for an additional leach treatment of the residue from (c) above, with concentrated sulfuric acid in an acid leach procedure in which the content of acid in the leach solution exceeds the remaining content of acid soluble iron in the residue. This treatment requires separation of the acid bearing solution from the residual solids, and provides for both recycle of solution to the neutral leach procedure of the process, and for accumulation of the final residue, as a concentrate of the valuable non-ferrous and precious metals from the mineral feed, and a major product of the process.

The counter-current leach process of this invention, as outlined above, frequently will achieve more complete extraction of iron from the solids than can be obtained by the co-current process. The additional liquid-solid separation required by this procedures, however, may be either difficult or costly, and the co-current process frequently will be chosen to avoid problems of this type. The choice of leach procedures, then, generally will be made on the basis of properties of the mineral feed.

The term "available solutions" as used herein and in the claims includes any solutions that may be available in the plant or economically obtainable from an outside source which can be introduced into the leaching system to increase the iron sulfate content of the feed materials and/or supply water to the leach pulp for purposes set forth above. Generally, but not necessarily, the "available solutions" may be iron sulfate solution generally considered to be waste materials such as mine water or pickle liquors. The process of this invention thus has the further advantage of not only being able to consume and utilize waste materials or solutions but is able to utilize these solutions to advantage in carrying out the process of this invention. Such control of pollution caused by pickle liquor and mine waters is a clear advantage of this invention over existing processes.

Figure 3:
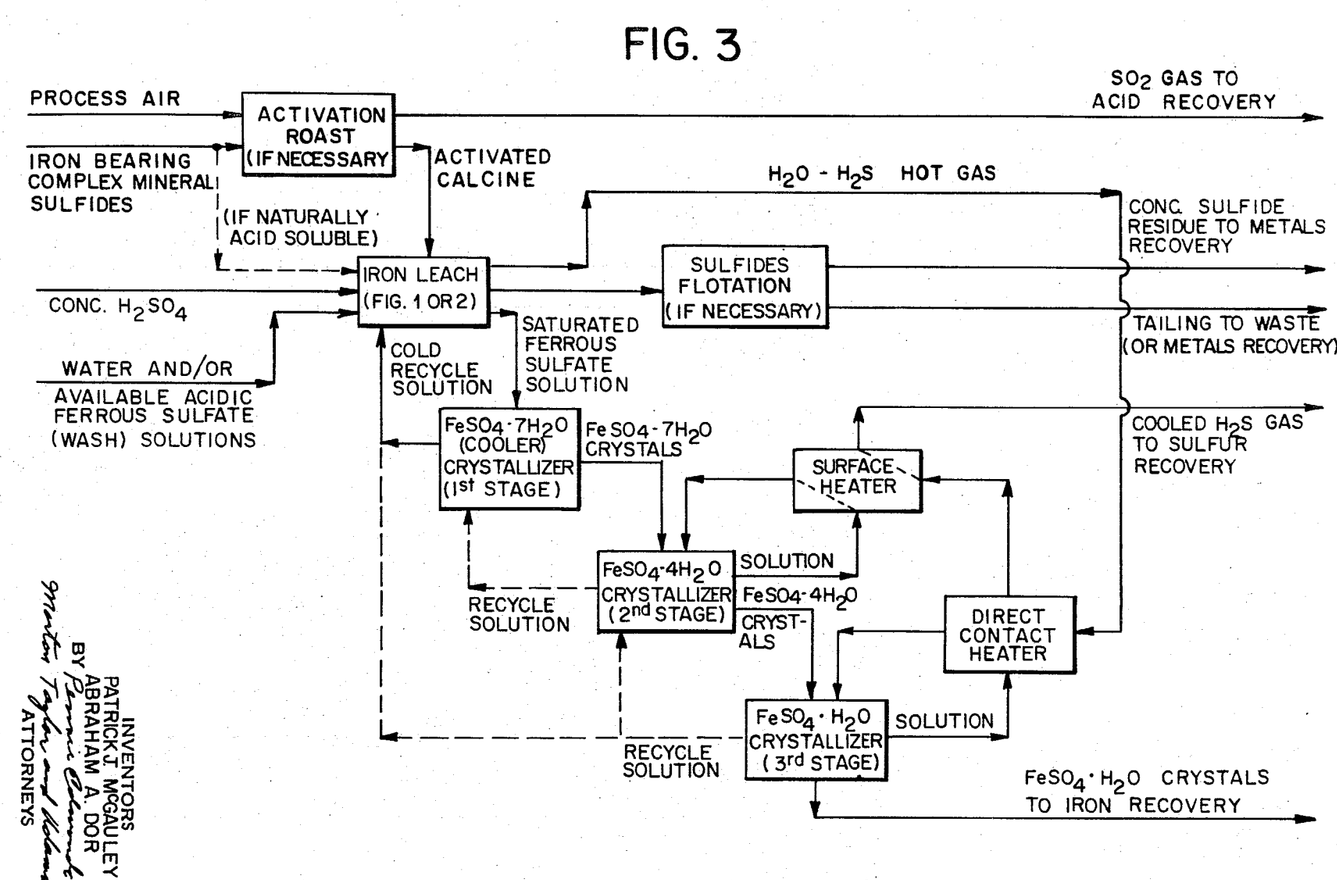
FIG. 3 is a flow diagram of a combined leaching and crystallizing process in accordance with this invention.

The almost saturated purified iron sulfate solution recovered from either the co-current or counter-current leach processes is then charged to a first stage (cooling) section of the crystallizer system as shown in FIG. 3.

In the first stage (cooling) section of the crystallizer system the feed solution now essentially saturated with iron sulfate at 60° to 70°C. is flash cooled to a temperature below about 50°C. and preferably in the range of 25° to 35°C. to precipitate crystals of $FeSO_4 \cdot 7H_2O$. It is advantageous to cool the solution to between about 10° to 30°C. to obtain an effective precipitation. As a result of cooling, a fraction of the iron sulfate is precipitated in the form of high purity crystals of $FeSO_4 \cdot 7H_2O$, or commercial copperas. The crystals are separated from the mother liquor on screens, or other conventional equipment as a major product from this stage of the crystallizer system. The mother liquor, now cold and partially depleted in content or iron, is recycled either to the gas cleaning system and/or to the last stages of the co-current leach system or to the last stages of neutral and/or acid leach circuits of the counter-current leach system, as a solvent for crystals of iron sulfate, an absorbent for waste heat, or a coolant for leach pulps or slurries as previously described.

The cold oversize crystals of $FeSO_4 \cdot 7H_2O$ produced on the screens of the first stage crystallizer, as discussed above, are charged to a saturated solution of iron sulfate in the second stage vessels of the crystallizer system. The solution is heated with waste heat from the gases generated in the leach system, as described above. The temperature in this stage of the crystallizer is mainted between about 56.5° and 64.8°C., a range of temperatures in which the stable hydrate of iron sulfate is $FeSO_4 \cdot 4H_2O$ as indicated on FIG. 4. The iron sulfate is converted from $FeSO_4 \cdot 7H_2O$ in the feed, to $FeSO_4 \cdot 4H_2O$ in the product from this crystallizer system.

The existence of iron sulfate as $FeSO_4 \cdot 4H_2O$ as an exact hydrate has been questioned by some scientists. This iron sulfate hydrate probably exists as indefinite composition of a mixture of various iron sulfate hydrates averaging about $FeSO_4 \cdot 4H_2O$. The formula $FeSO_4 \cdot 4H_2O$ is used herein in this context.

Figure 3A:
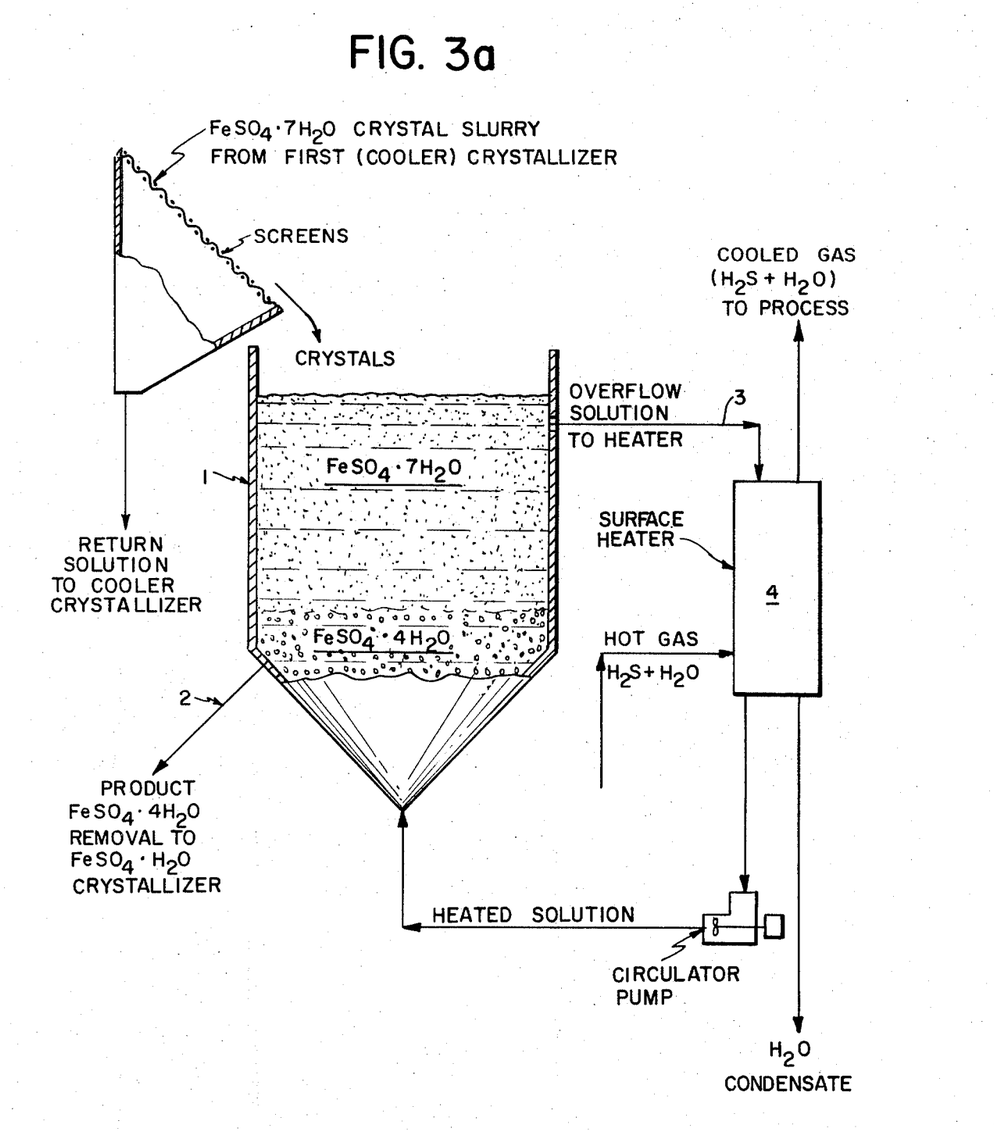
FIG. 3a is a schematic view of a crystallizer which can be used according to this invention.

FIG. 3a shows an example of equipment and a process for recovery of $FeSO_4 \cdot 7H_2O$ crystals and for the conversion thereof to $FeSO_4 \cdot 4H_2O$. The $FeSO_4 \cdot 7H_2O$ crystals are separated from the liquid on the screens as shown in FIG. 3a, causing the crystals to be deposited by gravity in the vessel 1 containing a saturated solution of iron sulfate maintained advantageously at a temperature between 56.5° and 64.8°C. They are gradually converted to the stable $FeSO_4 \cdot 4H_2O$ hydrated form and since these crystals are heavier than the seven hydrated crystals they fall to the bottom of the vessel and can be removed through line 2 and discharged to the third stage crystallizer which can utilize process and equipment similar to that described above for the second stage crystallizer with the exception of the solution heater.

The saturated solution of iron sulfate is removed from the top of the vessel 1 through line 3, to the heater 4, which can be a direct contact heater but is advantageously a surface heater, and charged to the bottom of the vessel 1 through line 5 as shown in the drawing by means of a suitable pump to maintain the temperature in the vessel at between about 65.5° and 64.8°C.

The water generated from the above conversion of $FeSO_4 \cdot 7H_2O$ to $FeSO_4 \cdot 4_2O$, accumulates in the form of an increasing supply of saturated solution in the second stage of this crystallization process. This excess solution may be either recycled to the first stage (cooling) crystallizer, or the excess water may be evaporated in the second stage of the crystallizer, and no excess solution produced.

In the combined leach and crystallization process of this invention, the waste heat available from the leach system generally will be sufficient both to dehydrate the $FeSO_4 \cdot 7H_2O$ to $FeSO_4 \cdot 4H_2O$, and to evaporate the excess water from the system. Consequently, evaporation rather than recycle, will be the preferred method for removal of the excess water from the system. The recycle method, however, will be used when waste heat is deficient.

The product crystals from the second stage of the crystallizer system ($FeSO_4 \cdot 4H_2O$) are separated from the solution, on conventional equipment such as screens, and are repulped in a solution saturated with iron sulfate, at temperatures above 65°C., in the manner described above for conversion of $FeSO_4 \cdot 7H_2O$ to $FeSO_4 \cdot 4H_2O$. The resulting slurry is heated to temperatures above 65°C., and advantageously in the range of 75° to 90°C., in direct contact with hot gases containing water vapor. At temperatures above 65°C., the stable hydrated iron sulfate is $FeSO_4 \cdot H_2O$, and the $FeSO_4 \cdot 4H_2O$ in the feed slurry to this section of the crystallizer is converted to $FeSO_4 \cdot H_2O$ in the third stage crystallizer. The $FeSO_4 \cdot H_2O$ being heavier settles to the bottom and can readily be recovered as a major product of the invention in the same manner as the $FeSO_4 \cdot 4H_2O$ is recovered. Solution heater 5 is a direct contact heater in which the solution is heated in direct contact with hot gases. When heating the iron sulfate solution to a temperature above 65°C. a direct contact heater must be used from a practical and economical standpoint. The monohydrate crystals can then be dewatered by centrifuge, for example, and recovered.

In the combined process of this invention, the above slurry of $FeSO_4 \cdot 4H_2O$ in a saturated solution of $FeSO_4$ is contacted with hot gases generated in the process and heated to temperatures above 65°C. with waste heat generated in the leach section and/or in other sections of the process. Furthermore, the combined process of this invention generally will provide sufficient waste heat to evaporate all water that is produced in conversion of $FeSO_4 \cdot 4H_2O$ to produce monohydrate ($FeSO_4 \cdot H_2O$) as the major product of the combined process.

Example I — Co-current Leach

This example utilizes a co-current leach procedure that can be carried out illustrating both the selective extraction of iron and concentration of the nonferrous metals from a sulfide mineral calcine that contains pyrite as a major component, and sulfide minerals of zinc, lead, and copper as minor components.

The original concentrate of sulfide minerals is roasted to remove a fraction of the sulfur content and to render the residual iron sulfide reactive with sulfuric acid to generate $H_2S$ gas and iron sulfate. The assay and composition of the calcine feed to this leach is approximately as follows:

| Component | Wt.% | Grams | Gm. Mols |
|---|---|---|---|
| Fe | 49.40 | 494.0 | 8.850 |
| S | 27.70 | 277.0 | 8.650 |
| Cu | 0.68 | 6.8 | 0.107 |
| Pb | 1.74 | 17.4 | 0.057 |
| Zn | 3.10 | 31.0 | 0.474 |
| Other | 17.38 | 173.8 | — |
| Total | 100.00 | 1000.0 | |

Approximately 850 grams of the above calcine are mixed with about 500 grams of wash solution to produce a high density pulp in closed vessel leach equipment that simulates the first stage of the selective co-current leach process of the invention. The entire charge, approximately 760 grams of concentrated sulfuric acid are mixed and allowed to react with the above slurry for a period of one hour. During the entire period of the leach reactions, streams of both additional wash solutions and $H_2S$ gas are injected to control both the density and the circulation of the pulp within the leach vessel.

The temperature of the pulp during the first stage high density leach described above, can be varied between 95° and 105°C, and the composition of the product slurry at 95°C. approximately as follows:

| Component | Wt.% | Grams | Gm.Mols |
|---|---|---|---|
| Unreacted Solids | | 285 | — |
| Crystals ($FeSO_4 \cdot H_2O$) | | 935 | 5.5 |
| Total Solids | 35. | 1120 | |
| Soluble $FeSO_4$ | | 520 | 3.4 |
| $H_2SO_4$ | | 110 | 1.1 |
| $H_2O$ | | 1620 | 90.0 |
| Total Liquids | 65. | 2250 | |
| Total Slurry | 100. | 3470 | |

The above slurry is diluted and cooled to about 80°C with additional wash solution, and an additional 100 gram fraction of the calcine mineral feed is mixed with the diluted slurry in the second stage of the co-current leach process of this invention. The new slurry is agitated by a stream of $H_2S$ gas injected at the bottom of the leach vessel, and allowed to react for approximately 1 hour at a temperature of 80° to 85°C. The composition of the reacted slurry from the second stage of the leach is approximately as follows:

| Component | Wt.% | Grams | Gm.Mols |
|---|---|---|---|
| Untreated Solids | | 305 | — |
| Crystals ($FeSO_4 \cdot H_2O$) | | 750 | 4.4 |
| Total Solids | 27.2 | 1055 | |
| Soluble $FeSO_4$ | | 840 | 5.5 |
| $H_2SO_4$ | | 10. | 0.1 |
| $H_2O$ | | 1980 | 110.0 |
| Total Liquid | 72.8 | 2830 | |
| Total Slurry | 100.0 | 3885 | |

The above product slurry from the second stage is diluted and cooled to about 65°C with a solution of $FeSO_4$ from the recycle from the cooler state of the crystallization process of this invention. The remaining 50 gram fraction of the calcine mineral feed is mixed with this diluted slurry in the third stage of the co-current leach process of this invention. This new slurry is agitated by a stream of $H_2S$ gas injected at the bottom of the leach vessel, and allowed to react for approximately one hour at a temperature of 60°–65°C. At the end of this leach the pH of the solution is about 1.8, and the composition of the slurry is approximately as follows:

| Component | Wt.% | Grams | Gm.Mols |
|---|---|---|---|
| Unreacted Solids | | 320 | — |
| Crystals | | None | |
| Total Solids | 3.7 | 320 | |
| $FeSO_4$ from Calcine | | 1180 | 7.78 |
| $FeSO_4$ from Recycles | | 1560 | 10.22 |
| $FeSO_4$ Total | | 2740 | 19.00 |
| Zn in Solution | Trace* | Trace* | Trace* |
| $H_2O$ | | 5660 | 314.0 |
| Total Solution | 96.3 | 8400 | |
| Total Slurry | 100.0 | 8720 | |
| Wt. of Soluble Fe = ±3600 | | | |
| Wt. of Soluble Zn | | | |

The above slurry is filtered at about 60°C, the residue is washed with water, and both the residue and filtrate are accumulated as products of the co-current leach process of this invention. The composition of the washed residue is approximately as follows:

| Component | Wt.% | Grams | Gm.Mols |
|---|---|---|---|
| Fe | 18.7 | 60.0 | 1.070 |

-Continued

| Component | Wt.% | Grams | Gm.Mols |
|---|---|---|---|
| S | 17.2 | 55.0 | 1.708 |
| Cu | 2.1 | 6.8 | 0.107 |
| Pb | 5.4 | 17.4 | 0.084 |
| Zn | 9.7 | 31.0 | 0.474 |
| Balance | 46.9 | 149.8 | — |
| Total | 100.0 | 320.0 | |
| Assumed Mineral Composition: | | | |
| FeS | 29.4 | 94.2 | 1.070 |
| CuS | 3.2 | 10.2 | 0.107 |
| PbS | 6.3 | 20.2 | 0.084 |
| ZnS | 14.5 | 46.3 | 0.474 |
| Insol. | 46.6 | 149.1 | — |
| Total | 100.0 | 320.0 | |

Example II — Concentration of Sulfide Components of Residue

The sulfide residue from Example I is repulped with water and the resulting slurry processed by froth flotation to separate the siliceous components for discard as waste, and to recover the valuable components in a sulfide flotation concentrate. The composition of the products from the process are approximately as follows:

Composition of Concentrate:

| Component | Wt.% | Grams | Gm.Mols |
|---|---|---|---|
| Fe | 33.0 | 56.0 | 1.00 |
| S | 30.6 | 52.0 | 1.62 |
| Cu | 3.7 | 6.3 | 0.10 |
| PB | 8.5 | 14.5 | 0.07 |
| Zn | 17.3 | 29.4 | 0.45 |
| Insol. | 6.9 | 11.8 | — |
| Total | 100.0 | 170.0 | |

Approximate Composition of Tailings:

| Composition | Wt.% | Grams | Gm.Mols |
|---|---|---|---|
| Fe | 2.5 | 3.4 | 0.06 |
| S | 1.9 | 2.6 | 0.08 |
| Cu | 0.4 | 0.6 | 0.01 |
| Pb | 1.4 | 2.0 | 0.01 |
| Zn | 1.0 | 1.3 | 0.02 |
| Insol. | 92.8 | 127.1 | — |
| Total | 100.0 | 137.0 | |
| Accounted for = | 307.0 = 96% Wt. | | |
| | 320.0 | | |

Example III — Crystallization and Dehydration of FeSO₄

The purified leach solution from Example I, which is available at about 60°C, is cooled to about 30°C. by the (flash) evaporation of water at reduced pressure, in the cooling stage of the crystallization and dehydration process of this invention. As a result of both the evaporation of water from the solution, and the reduced solubility of $FeSO_4$ at the lower temperature, crystals of $FeSO_4 \cdot 7H_2O$ (copperas) are precipitated and a slurry is obtained of the following approximate composition at 30°C.:

| Component | Wt.% | Grams | Gm. Mols |
|---|---|---|---|
| Crystals ($FeSO_4 \cdot 7H_2O$) | 31.2 | 2500 | 9.0 |
| Soluble $FeSO_4$ | — | 1360 | 9.0 |
| $H_2O$ | — | 4170 | 226.0 |
| Total Solution | 68.8 | 5530 | |
| Total Slurry | 100.0 | 8030 | |
| Crystals from Calcine | 77.2 | 1930 | 7.8 |
| Crystals from Import Solutions | 22.8 | 570 | 1.22 |
| Crystals Total (Above) | 100.0 | 2500 | 9.00 |

The above slurry is processed on screens at 30°C to separate the crystals, and the solution is accumulated for recycle to the third stage of the leach process of this invention, as described in Example I. The cold crystals of $FeSO_4 \cdot 7H_2O$ are repulped in a solution that is essentially saturated with $FeSO_4$ at ± 60°C, and this solution is heated to about 60°C by the transfer of heat through the walls of the equipment in the second stage of the crystallization process. As a result of the higher temperature, the crystals of $FeSO_4 \cdot 7H_2O$ are converted to crystals of $FeSO_4 \cdot 4H_2O$ in a slurry of the following approximate composition at 60° to 65°C.

| Component | Wt.% | Grams | Gm.Mols |
|---|---|---|---|
| Crystals ($FeSO_4 \cdot 4H_2O$) | 25.8 | 2080 | 9.0 |
| Soluble ($FeSO_4$) | | 2050 | 13.5 |
| $H_2O$ | | 3950 | |
| Total Solution* | 74.2 | 6000 | |
| Total Slurry | 100.0 | 8080 | |

*This solution is maintained at constant volume by the evaporation (at reduced pressure) of water in quantities equivalent to the production of water in the conversion of $FeSO_4 \cdot 7H_2O$ to $FeSO_4 \cdot 4H_2O$ by the preferred procedures of the process of this invention.

The above product slurry from the second stage of this crystallizer process is subjected to a conventional liquid-solid separation procedure at 60°C, and the solution is recycled to the repulp procedure of the second stage of the process. The crystals of $FeSO_4 \cdot 4H_2O$ at about 60°C are repulped in a solution recycled from the third stage of the process and saturated with $FeSO_4$ at about 80°C, the resulting slurry is contacted with hot gases containing water wapor in the third stage of the crystallizer process of this invention. As a result of the above contacting, the slurry is heated to about 80°C, the crystals of $FeSO_4 \cdot 4H_2O$ are converted to crystals of $FeSO_4 \cdot H_2O$, and water is evaporated from the slurry equivalent in quantity to the production of water in conversion of the $FeSO_4 \cdot 4H_2O$ to $FeSO_4 \cdot H_2O$. The composition of the product slurry from the third stage of this crystallizer process at the temperature of about 80°C is approximately as follows:

| Component | Wt.% | Grams | Gm.Mols |
|---|---|---|---|
| Crystals ($FeSO_4 \cdot H_2O$) | 24.2 | 1530 | 9.0 |
| Soluble $FeSO_4$ | | 1550 | 10.2 |
| $H_2O$ | | 3250 | |
| Total Solution | 75.8 | 4800 | |
| Total Slurry | 100.0 | 6330 | |

The above product slurry from the third stage of this crystallizer process is subjected to a conventional liquid-solid separation procedure, and the solution is recycled to the repulp procedure of this stage of the process.

The monohydrate produce crystals ($FeSO_4 \cdot H_2O$) from this stage of the process, are accumulated as the major product of the crystallization and dehydration process of this invention.

Example IV — Counter-Current Leach

This example utilizes the counter-current leach procedures of this invention that can be carried out to illustrate both the selective extraction of iron and concentration of non-ferrous metals from a sulfide mineral concentrate that contains natural pyrrhotite as a major component, and sulfide minerals of nickel, cobalt, and copper as minor components of the weight. The iron sulfide content of this feed was reactive with sulfuric acid to generate $H_2S$ gas and iron sulfate. The composition and content of this feed was approximately as follows:

| Component | Wt.% | Grams | Gm. Mols |
|---|---|---|---|
| Fe | 48.16 | 481.6 | 8.600 |
| S | 28.61 | 286.1 | 8.950 |

-Continued

| Component | Wt.% | Grams | Gm. Mols |
|---|---|---|---|
| Cu | 0.64 | 6.4 | 0.100 |
| Ni | 1.38 | 13.8 | 0.235 |
| Co | 0.14 | 1.4 | 0.025 |
| Other | 21.07 | 210.7 | — |
| Total | 100.00 | 1000.0 | |

The entire charge (1000 grams) of the above mineral mixed with a recycle solution (from the acid leach stage of the process) to process a high density pulp in the closed vessel leach equipment of the first stage of the selective counter-current leach process of this invention. About 370 grams, or approximately one half of the total charge of concentrated sulfuric acid is mixed with the above slurry and allowed to react for a period of about 1 hour. During the entire period of the leach reactions, streams of both dilute wash solution and $H_2S$ gas are injected to control the density of the pulp and the degree of agitation within the vessel, respectively.

The temperature of the pulp during the first stage (high density) neutral leach described above is between 80° and 95°C, and the composition of the product slurry at about 80°C is as follows:

| Composition | Wt.% | Grams | Gm.Mols |
|---|---|---|---|
| Unreacted Solids | | 500 | — |
| Crystals ($FeSO_4.H_2O$) | | 940 | 5.5 |
| Total Solids | 37.0 | 1440 | |
| Soluble $FeSO_4$ | | 610 | 4.0 |
| $H_2SO_4$ | | 50 | 0.5 |
| $H_2O$ | | 1800 | 100.0 |
| Total Solution | 63.0 | 2460 | |
| Total Slurry | 100.0 | 3900 | |

The above slurry is diluted and cooled to about 60° and to 65°C by mixing with a cold solution from the first (cooling) stage of the crystallizer system, in the second stage (low density, neutral) leach of the counter-current leach process of this invention. The diluted pulp is contacted and circulated in the leach vessel for about one hour by the injection of $H_2S$ gas at the bottom of the vessel. At the end of this leach period, the pH of the solution is about 1.9 and the compostion of the slurry at about 60°C is approximately as follows:

| Component | Wt.% | Grams | Gm.Mols |
|---|---|---|---|
| Unreacted Solids | | 460 | — |
| Crystals ($FeSO_4.H_2O$) | | None | |
| Total Solids | 4.1 | 460 | |
| Soluble $FeSO_4$ | | 3500 | 23 |
| Soluble Ni | | None | — |
| $H_2SO_4$ | | None | — |
| $H_2O$ | | 7200 | 400. |
| Total Solution | 95.9 | 10,000 | |
| Total Slurry | 100.0 | 11,160 | |

The above slurry is subjected to a conventional liquid-solid separation and the purified solution is accumulated as a feed liquor to the first (cooling) stage of the crystallizer, and as a major product from the counter-current leach process of this invention.

The solids from the above slurry are repulped in a dilute (wash) solution, mixed with the remaining fraction of the sulfuric acid (about 360 grams), and allowed to react for about one hour. During the entire period of this leach, streams of both dilute (wash) solution and process steam are injected into the leach vessel and are modulated to control the density and the circulation of the pump within the vessel, respectively.

The temperature of the pulp during the acid leach described above is between 95° and 105°C., and the composition of the product slurry at 95°C. is approximately as follows:

| Component | Wt.% | Grams | Gm.Mols |
|---|---|---|---|
| Unreacted Solids | | 365 | — |
| Crystals ($FeSO_4.H_2O$) | | None | — |
| Total Solids | 18.4 | 365 | |
| Soluble $FeSO_4$ | | 340 | 2.2 |
| $H_2SO_4$ | | 195 | 2.0 |
| $H_2O$ | | 1080 | 60.0 |
| Total Liquid | 81.6 | 1615 | |
| Total Slurry | 100.0 | 1980 | |

The above slurry is cooled and subjected to a conventional liquid-solid separation, and the solution is recycled to the first (neutral) leach stage of the process. The solids, now concentrated in content of nickel, copper and cobalt, are washed with water and accumulated as a major project of the counter-current leach process of this invention.

We claim:

1. A selective multi-stage leaching process for the extraction of acid reactive iron from sulfide mineral feed, and for the production of a high purity solution of ferrous sulfate, which comprises:

a. contacting the iron sulfide mineral feed in closed vessel leaching equipment with sulfuric acid to form a slurry in which the acid content is deficient to the acid soluble iron in the mineral feed on a stoichiometric basis at sufficient concentrations and temperatures to initiate and produce a high rate of reaction between the acid and the acid soluble iron in the mineral solids, and to generate ferrous sulfate, process heat, and $H_2S$ gas, b. simultaneously diluting the above slurry with a member of the group consisting of water, aqueous solutions containing ferrous sulfate, sulfuric acid, or mixtures thereof, in quantities sufficient to maintain, in the first stage of the leach, a high density slurry at a vicosity that will permit circulation of the slurry in the equipment, c. continuing the reaction of the solids with acid in the first stage of the leach, to produce a product that contains residual solids from the mineral feed in a solution that is essentially saturated with ferrous sulfate and containing crystals of ferrous sulfate, and a gas that contains $H_2S$ and water vapor, d. mixing the above slurry with an aqueous solution that is unsaturated with respect to ferrous sulfate to dissolve the ferrous sulfate crystals and to cause the reaction of the remaining acid and impurities in the solution with acid soluble iron from the mineral feed and $H_2S$ from the gas respectively to complete the leaching in a second stage leach and the produce a low density product slurry containing residue in which the content of acid soluble iron from the mineral feed exceeds the acid content of the solution on a stoichiometric basis, a purified solution that is essentially saturated with ferrous sulfate at temperatures between 80° and 50°C, and and a gas that contains $H_2S$ and water vapor, e. separating the solution from the solids at temperatures between 80° and 50°C, and f. collecting the $H_2S$ gas from the leach vessels, the solid residue, and the purified solution as products of the leaching process.

2. The process of claim 1 in which the mineral feed to the high density first stage of the leach contains acid soluble iron in quantities deficient to the acid content of the solution on a stoichiometric basis, and additional mineral feed is charged to the low density last stage of the leach in quantities sufficient to neutralize the excess acid, precipitating the impurities from the solution, and providing acid soluble iron in the residue from the last stage of the leach.

3. The process of claim 1 in which the solid residue from step (d) is contacted with an acid solution in which the content of acid exceeds the content of acid soluble iron in the solid residue on a stoichiometric basis, the resulting pulp is reacted until the acid soluble iron is extracted from the solid residue, the acidic solution is separated from the solid residue and recycled to the first stage of the leach, and the remainder of solid residue are accumulated as a product of the leaching process.

4. The process of claim 1 in which the high density slurry in the first stage of the leach is contacted with steam, the steam is modulated in quantity to lower the partial pressure of $H_2S$ in the leach vessels, and the combined gas containing steam and $H_2S$ gas is separated from the slurry and collected as a product of the leaching process.

5. The process of claim 1 in which the low density slurry in the last stage of the leach is contacted with $H_2S$ gas, the gas is modulated in quantity to increase the partial pressure of $H_2S$ in the leach vessels, and to assure the precipitation of impurities from the leach solution, and the combined gas containing steam and $H_2S$ gas is separated from the slurry and collected as a product of the leaching process.

6. The process of claim 1 in which water is added to the first stage leach in sufficient amounts to maintain the slurry at a viscosity just sufficient to permit circulation of the slurry.

7. The process of claim 1 in which the acid concentration in step (a) is above 40% $H_2SO_4$ and the temperature above 80°C.

8. The combined process of selective leaching to extract iron from a sulfide mineral feed that contains acid soluble iron, with solutions of sulfuric acid, purification of the solution, and the production of high purity crystals of ferrous sulfate monohydrate ($FeSO_4.H_2O$), a residue that contains concentrated impurities from the feed materials, and a gas that contains $H_2S$ and water vapor, which comprises:

a. reacting the mineral feed with sulfuric acid in closed leaching vessel equipment at a sufficiently high concentration and at a sufficiently high temperature to initiate and produce a high rate of reaction between the acid and the acid soluble iron to produce a high density slurry that contains residue from the feed materials and crystals of ferrous sulfate, and a gas that contains $H_2S$ and water vapor, b. diluting and cooling the high density slurry and contacting the liquid of the slurry with the solids and gases to dissolve the sulfate crystals, to react the acid and the impurities in the solution with both acid soluble iron from the solids and $H_2S$ from the gas respectively, to produce a low density slurry of residual solids that contains acid soluble iron from the mineral feed, a purified solution that is essentially saturated with ferrous sulfate at temperatures between 85° and 50°C, and a gas that contains $H_2S$ and water vapor, c. separating the gas and the solids from the slurry at temperatures between about 80° and 50°C., d. cooling the purified solution of ferrous sulfate to temperatures below 50°C to precipitate crystals of copperas ($FeSO_4 . 7H_2O$), e. Separating the crystals from the solution at temperatures below about 50°C, f. mixing the cold solution from the copperas with the high density slurry from the first stage of the leach in quantities that are capable of dissolving all crystals of ferrous sulfate in the low density second stage of the leach, g. repulping the copperas in a saturated solution of ferrous sulfate and heating the solution by heat exchange with the hot $H_2S$ bearing gas from the leach vessels to dehydrate a fraction of the crystals from $FeSO_4.7H_2O$ to $FeSO_4.4H_2O$, and to produce a high density slurry of crystals in a saturated solution of ferrous sulfate at temperatures between 45° and 65°C, h. contacting the high density slurry of crystals with hot gases to evaporate the water and to produce essentially dry crystals of $FeSO_4.H_2O$ at temperatures above about 65°C, i. collecting the dry crystals, the cooled $H_2S$ gas, and the residue from the leach as products of the process.

9. The process of claim 8 in which the purified solution produced according to step (b) from the leach is subjected to reduced pressure, water is evaporated and removed from the leach solution by waste heat from the leach reactions, and additional crystals of copperas are precipitated from the solution.

10. The process of claim 9 in which the resulting solution is reheated by heat exchange with and the condensation of additional water from the hot $H_2S$ bearing gas from the leach, additional water is evaporated and removed from the solution by waste heat from the leach reactions, and additional crystals of copperas are precipitated from the solution.

11. The process of claim 8 in which the slurry containing crystals of $FeSO_4.4H_2O$ is subjected to reduced pressure at temperatures between about 56° and 65°C., to evaporate and remove water and additional crystals of $FeSO_4.4H_2O$ are precipitated from the solution.

12. The process of claim 11 in which the solution in contact with the crystals of $FeSO_4.4H_2O$ is heated by heat exchange with and the condensation of water from the $H_2S$—water vapor gas from the leach, additional water is evaporated and removed from the solution by waste heat from the leach reactions, and additional crystals of $FeSO_4.4H_2O$ are precipitated from the solution.

13. The process of claim 1 in which the purified solution produced in step (d) is essentially saturated with ferrous sulfate at a temperature of about 65°C and the solution separated form the solids during step (e) at about 65°C.

14. The process of claim 8 in which the purified solution in step (b) is essentially saturated with ferrous sulfate at a temperature of about 65°C and the gas and solids separated in step (c) are separated at a temperature of about 65°C.

15. The process of claim 8 in which the purified solution is cooled in step (d) to a temperature below about 35°C. and the crystals are separated from the solution in step (e) at a temperature below 35°C.

* * * * *